US009015370B2

(12) United States Patent
Kusuyama

(10) Patent No.: US 9,015,370 B2
(45) Date of Patent: Apr. 21, 2015

(54) INFORMATION PROCESSING SYSTEM

(75) Inventor: Hiroshi Kusuyama, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 459 days.

(21) Appl. No.: 13/033,677

(22) Filed: Feb. 24, 2011

(65) Prior Publication Data

US 2011/0228461 A1 Sep. 22, 2011

(30) Foreign Application Priority Data

Mar. 18, 2010 (JP) ................................. 2010-062754

(51) Int. Cl.
*G06F 13/00* (2006.01)
*G06F 1/16* (2006.01)
*G06F 13/40* (2006.01)

(52) U.S. Cl.
CPC .......... *G06F 1/1632* (2013.01); *G06F 13/4022* (2013.01); *G06F 13/4068* (2013.01)

(58) Field of Classification Search
CPC ......................... G06F 13/4068; G06F 13/4022
USPC .......................................................... 710/38
See application file for complete search history.

(56) References Cited

U.S. PATENT DOCUMENTS

| | | | |
|---|---|---|---|
| 5,687,387 A | 11/1997 | Endejan et al. | |
| 5,911,079 A | 6/1999 | Yang et al. | |
| 5,982,614 A | 11/1999 | Reid | |
| 6,098,127 A | 8/2000 | Kwang | |
| 6,895,447 B2 * | 5/2005 | Brewer et al. ................... | 710/11 |
| 7,380,142 B2 | 5/2008 | Lee et al. | |
| 2007/0150634 A1 | 6/2007 | Chiba | |
| 2008/0042616 A1 * | 2/2008 | Monks et al. ................. | 320/106 |
| 2010/0109795 A1 * | 5/2010 | Jones et al. .................... | 333/101 |
| 2010/0115147 A1 * | 5/2010 | Kim ................................ | 710/14 |
| 2010/0283506 A1 * | 11/2010 | Avian .............................. | 326/62 |

FOREIGN PATENT DOCUMENTS

| | | |
|---|---|---|
| JP | H 08-511887 | 12/1996 |
| JP | 10-260757 | 9/1998 |
| JP | 2001-147749 | 5/2001 |
| KR | 2003060369 | 7/2003 |
| KR | 100407930 B | 11/2003 |
| WO | WO 94/27224 | 11/1994 |

OTHER PUBLICATIONS

Herbold et al.: "Whole story of 'Power over Ethernet', the technology of sending power safely without affecting data transmission"; Nikkei Electronics, Japan, Nikkei Business Publications, Inc., Nov. 24, 2003, 11-24 (No. 861), 2003, pp. 125-132.

* cited by examiner

*Primary Examiner* — Henry Tsai
*Assistant Examiner* — John Roche
(74) *Attorney, Agent, or Firm* — Hamre, Schumann, Mueller & Larson, P.C.

(57) ABSTRACT

A terminal 50*a* functions as a signal terminal when a first PC 30 and a first port replicator 50 are connected to each other. A terminal 60*a* functions as a power terminal when a second PC 40 and a second port replicator 60 are connected to each other. Thus, even if the PC or the port replicator becomes multifunctional, it is possible to suppress a significant increase in the number of pins of the connectors 11 and 23. Further, it is possible to keep up with functionally improved PCs and port replicators while maintaining compatibility with the past products.

1 Claim, 4 Drawing Sheets

INFORMATION PROCESSING SYSTEM

BACKGROUND

1. Field

The present application relates to an information processing system.

2. Description of Related Art

In recent years, a connection device called a port replicator often is used to connect a variety of peripheral devices to an information processor such as a notebook computer. Port replicators are provided with a plurality of signal terminals to which cables dedicated to a variety of interface standards can be connected. A port replicator can be connected to a notebook computer as follows. By attaching the port replicator's connector to a connector of the notebook computer provided specifically for a port replicator, they can be connected to each other. The notebook computer can switch between different signals and output the signal depending on the types of peripheral devices connected to the port replicator.

JP H10-260757 A discloses an apparatus for inspecting computer peripheral devices. The apparatus can switch between different signals and output the signal depending on the types of peripheral devices connected to an interface circuit.

The configuration disclosed in JP H10-260757 A, however, has the following problem. The connector of the port replicator needs to be provided with a pin for transmitting/receiving signals for each peripheral device as well as a pin for supplying each peripheral device with power. Thus, when the number of peripheral devices connectable to the port replicator increases, the number of pins significantly increases, which leads to an increase in the size of both the connector of the port replicator and the connector of the notebook computer.

SUMMARY

The present application discloses an information processing system including an information processor and a connection device, where the information processor and the connection device are connectable to each other. The connection device includes a terminal selectively connectable to a plurality of the information processors, when a first information processor, among the plurality of the information processors, is connected to the connection device, a signal terminal of the first information processor is connected to the terminal, and when a second information processor, among the plurality of the information processors, is connected to the connection device, a power terminal of the second information processor is connected to the terminal.

DETAILED DESCRIPTION OF THE EMBODIMENTS (Embodiment)

[1. Configuration of Electronic Device]

Figure 1:
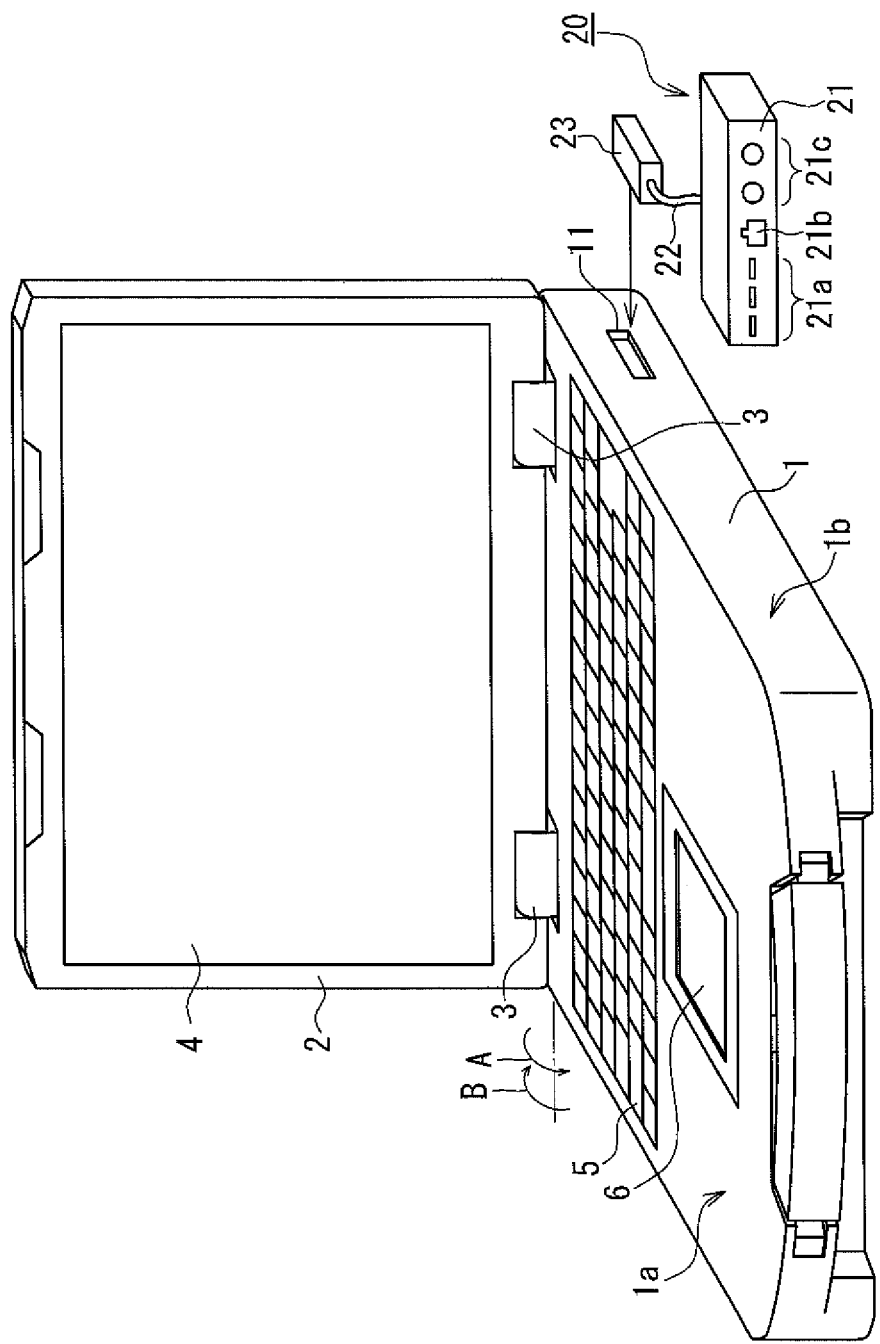
FIG. 1 is a perspective view of a notebook computer and a port replicator according to one embodiment.

FIG. 1 is an external view of a notebook computer and a port replicator according to the present embodiment. It should be noted that the notebook computer is one example of the information processor according to the present embodiment and the port replicator is one example of the connection device according to the present embodiment.

As shown in FIG. 1, the notebook computer includes a first enclosure 1 and a second enclosure 2. The first enclosure 1 includes, among others, a hard disk drive and a circuit board on which a variety of electronic components are mounted. The second enclosure 2 includes a display unit 4 (liquid crystal display). Each of the first enclosure 1 and the second enclosure 2 is supported rotatably by hinges 3. The hinges 3 each include a spindle for supporting the first enclosure 1 and the second enclosure 2 rotatably in the direction indicated by the arrow A or B. A keyboard 5 and a pointing device 6 are placed on a top face 1a of the first enclosure 1. A connector 11 is placed on a side face 1b of the first enclosure 1. A port replicator 20 can be connected to the connector 11.

The port replicator 20 includes a main body 21, a cable 22 and a connector 23. The main body 21 and the connector 23 are connected to each other electrically via the cable 22. The main body 21 is provided with a plurality of terminals to which peripheral devices can be connected. For example, the main body 21 according to the present embodiment includes, but are not limited to, USB (Universal Serial Bus) terminals 21a, a LAN (Local Area Network) terminal 21b, and external display terminals 21c. The connector 23 is attachable to and detachable from the connector 11 provided for the notebook computer electrically and mechanically. The connector 23 includes a plurality of pins so that a signal and power can be supplied to the variety of terminals provided for the main body 21. The connector 23 has the same number of pins as the connector 11 provided for the notebook computer.

Hereinafter, a description will be given of an information processing system for connecting the notebook computer and the port replicator 20 to each other.

[2. Configuration and Operation of Information Processing System]

The port replicator 20 according to the present embodiment can be connected selectively to a plurality of types of notebook computers.

Figure 2:
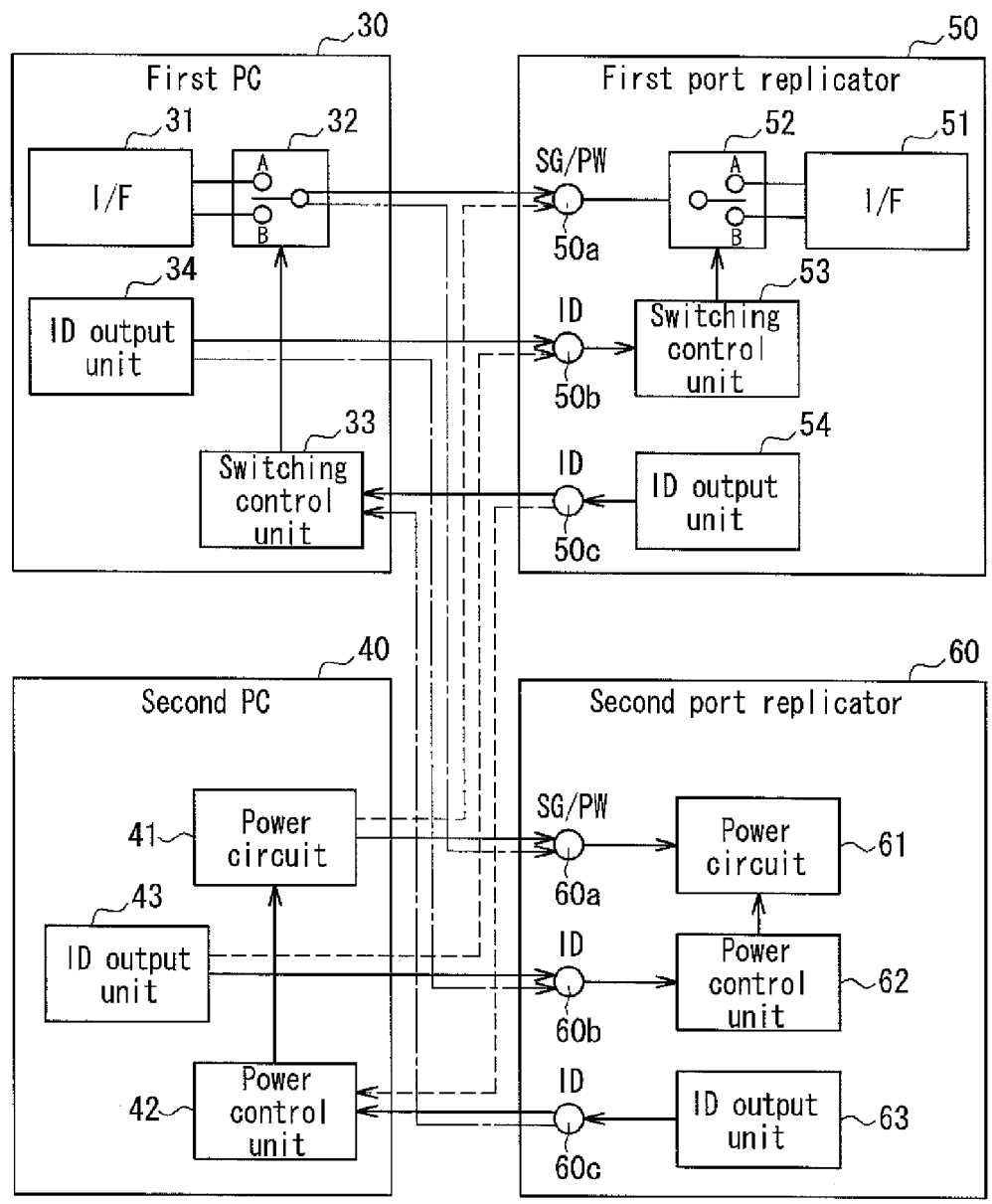
FIG. 2 is a block diagram of an information processing system according to one embodiment.

FIG. 2 is a block diagram of the information processing system. As an example, the information processing system shown in FIG. 2 includes a first PC (personal computer) 30, a second PC 40, a first port replicator 50 and a second port replicator 60. The first PC 30 and the second PC 40 each can be connected to the first port replicator 50 or the second port replicator 60 selectively. Peripheral devices (not shown) can be connected to each of the first port replicator 50 and the second port replicator 60. The number of PCs connectable to the port replicator 20 is not limited to two as in the example shown in FIG. 2.

The first PC 30 and the second PC 40 each include a connector corresponding to the connector 11 shown in FIG. 1. The connector provided for the first PC 30 and that provided for the second PC 40 have the same shape and the same number of pins. However, functions assigned to the pins of one connector differ from those of the other connector. Also, electric signals supplied to the pins of one connector differ from those of the other connector. The first PC 30 includes an interface circuit 31, a switch 32, a switching control unit 33, and an ID output unit 34. The second PC 40 includes a power circuit 41, a power control unit 42 and an ID output unit 43. Although the first PC 30 and the second PC 40 each include components that generally are incorporated in PCs, such as a CPU and a memory, such components are not illustrated in the drawings and will not be described in detail in the present embodiment. Further, the second PC 40 includes the same components as the interface circuit 31, the switch 32, the switching control unit 33 and the ID output unit 34 shown in FIG. 2. Also, the first PC 30 includes the same components as the power circuit 41, the power control unit 42 and the ID output unit 43 shown in FIG. 2.

The first port replicator 50 includes terminals 50a, 50b and 50c. The terminals 50a, 50b and 50c each can be connected to the connector of the first PC 30 or the connector of the second PC 40 selectively. The terminal 50a can supply signals. Specifically, the terminal 50a functions as a signal terminal when the first PC 30 is connected to the first port replicator 50. The terminal 50a supplies neither a signal nor power when the second PC 40 is connected to the first port replicator 50. In accordance with the models and production years of the PCs and peripheral devices, the terminal 50a is preferably changed to operate as a signal terminal and not to receive a signal and power. The terminals 50b and 50c are used for exchanging ID information between the PCs and the port replicator. The first port replicator 50 includes an interface circuit 51, a switch 52, a switching control unit 53, and an ID output unit 54. For example, a LAN cable or a device (e.g., a television set, a DVD recorder) connectable through an interface based on, for example, the HDMI (High Definition Multimedia Interface) standards can be connected to the interface circuit 51.

The second port replicator 60 includes terminals 60a, 60b and 60c. The terminals 60a, 60b and 60c each can be connected to the connector of the first PC 30 or the connector of the second PC 40 selectively. The terminal 60a can conduct power. Specifically, the terminal 60a functions as a power terminal when the second PC 40 is connected to the second port replicator 60. The terminal 60a supplies neither a signal nor power when the first PC 30 is connected to the second port replicator 60. It is preferable that allowing the terminal 60a to function as a power terminal and forcing the terminal 60a not to supply a signal and power can be switched back and forth as needed based on the models and production years of the computers and peripheral devices. The terminals 60b and 60c are used in exchanging ID information between the PCs and the port replicator. The second port replicator 60 includes a power circuit 61, a power control unit 62 and an ID output unit 63. For example, a printer and a pointing device among others can be connected to the power circuit 61 through a floppy disk drive, SCSI (Small Computer System Interface), etc.

It should be noted that the terminals 50a, 50b and 50c are included in the connector (corresponding to the connector 23 in FIG. 1) of the first port replicator 50. The terminals 60a, 60b and 60c are included in the connector (corresponding to the connector 23 shown in FIG. 1) of the second port replicator 60. With respect to the connectors, the terminals 50a and 60a are arranged at the same position (pin arrangement). The terminals 50b and 50c may be arranged at the same or different positions from the terminals 60b and 60c. For example, the terminal of the connector 11 to which the terminal 50a is connected when the connector (corresponding to the connector 23 in FIG. 1) of the first port replicator 50 is connected to the connector (corresponding to the connector 11 in FIG. 1) of the first PC 30 is the same as the terminal of the connector 11 to which the terminal 60a is connected when the connector (corresponding to the connector 23 in FIG. 1) of the second port replicator 60 is connected to the connector (corresponding to the connector 11 in FIG. 1) of the first PC 30. Here, the "connection" between the terminals refers to a mechanical connection, and an electrical connection between the terminals will be described later.

Figure 3:
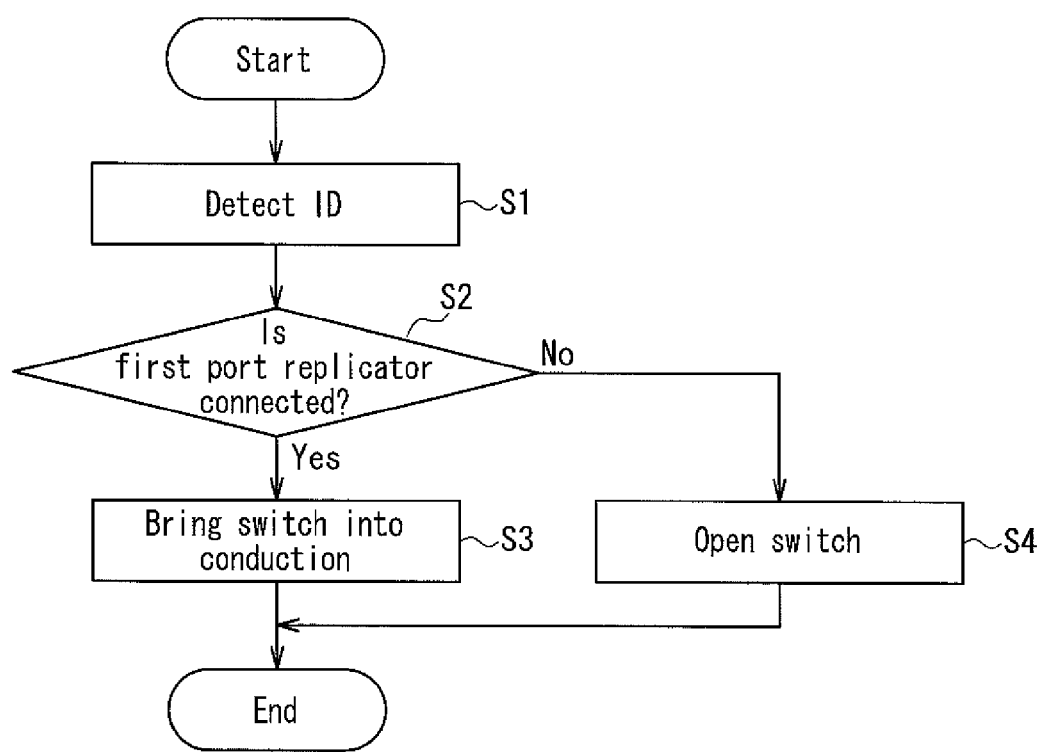
FIG. 3 is a flowchart of the information processing system according to one embodiment.

FIG. 3 is a flowchart showing the operation of the information processing system. Hereinafter the operation of the information processing system will be described.

[2-1. Connection Between First PC 30 and First Port Replicator 50]

When the first PC 30 and the first port replicator 50 are connected to each other (solid lines in FIG. 2), the output terminal of the switch 32 of the first PC 30 is connected to the terminal 50a of the first port replicator 50. Further, the ID output unit 34 and the switching control unit 33 are connected to the terminals 50b and 50c of the first port replicator 50, respectively. As a result, the switching control unit 53 can detect the ID information outputted from the ID output unit 34. Further, the switching control unit 33 can detect the ID information outputted from the ID output unit 54 (S1).

On the basis of the detected ID information, the switching control unit 33 determines the type of the port replicator connected to the first PC 30. Further, on the basis of the detected ID information, the switching control unit 53 determines the type of the PC connected to the first port replicator 50 (S2).

In accordance with the determination result, the switching control unit 33 controls the switching operation of the switch 32. Specifically, when the switching control unit 33 determines that the port replicator connected to the first PC 30 is the first port replicator 50, it controls the switch 32 to be connected to, for example, the side A. Further, the switching control unit 53 controls the switching operation of the switch 52 in accordance with the determination result. Specifically, when the switching control unit 53 determines that the PC connected to the first port replicator 50 is the first PC 30, it controls the switch 52 to be connected to, for example, the side A. As a result, the interface circuit 31, the switch 32, the terminal 50a, the switch 52, and the interface circuit 51 are brought into conduction (S3).

For this reason, a control signal outputted from the interface circuit 31 of the first PC 30 is sent to the interface circuit 51 through the switch 32, the terminal 50a, and the switch 52. When a peripheral device is connected to the interface circuit 51, the control signal supplied to the interface circuit 51 is sent to the peripheral device. For example, when a television set is connected to the first port replicator 50, a display signal is sent to the television set.

Further, when a peripheral device other than a television set is connected to the first port replicator 50, the switching control unit 33 determines the type of the peripheral device based on the ID information sent from the ID output unit 54 and controls the switch 32 to be connected to the side B. Further, the switching control unit 53 determines the type of the PC based on the ID information sent from the ID output unit 34 and controls the switch 52 to be connected to the side B. Thus, even if a peripheral device other than a television set is connected to the first port replicator 50, it is possible to control the operation of the peripheral device through the first PC 30.

As described above, the terminal 50a of the first port replicator 50 can be operated as a signal terminal.

[2-2. Connection Between Second PC 40 and Second Port Replicator 60]

When the second PC 40 and the second port replicator 60 are connected to each other (solid lines in FIG. 2), the output terminal of the power circuit 41 of the second PC 40 is connected to the terminal 60a. Further, the ID output unit 43 and the power control unit 42 are connected to the terminals 60b and 60c, respectively. As a result, the power control unit 62 can detect the ID information outputted from the ID output unit 43. Further, the power control unit 42 can detect the ID information outputted from the ID output unit 63 (S1).

On the basis of the detected ID information, the power control unit 42 determines the type of the port replicator connected to the second PC 40. Further, on the basis of the detected II) information, the power control unit 62 determines the type of the PC connected to the second port replicator 60 (S2).

In accordance with the determination result, the power control unit 42 controls the operation of the power circuit 41. Further, the power control unit 62 controls the operation of the power circuit 61 in accordance with the determination result. Thus, the power circuit 41, the terminal 60a and the power circuit 61 are brought into conduction (S3).

For this reason, power outputted from the power circuit 41 of the second PC 40 is, for example, sent to the power circuit 61 through the terminal 60a. On the basis of the power sent to the power circuit 61, the second port replicator 60 supplies power to a peripheral device (not shown) connected to the power control unit 42.

As described above, the terminal 60a of the second port replicator 60 can be operated as a power terminal.

[2-3. Connection Between First PC 30 and Second Port Replicator 60]

When the first PC 30 and the second port replicator 60 are connected to each other (alternate long and short dashed lines in FIG. 2), the output terminal of the switch 32 of the first PC 30 is connected to the terminal 60a. Further, the ID output unit 34 and the switching control unit 33 are connected to the terminals 60b and 60c, respectively. As a result, the power control unit 62 can detect the ID information outputted from the ID output unit 34. Further, the switching control unit 33 can detect the ID information outputted from the ID output unit 63 (S1).

The switching control unit 33 determines the type of the port replicator connected to the first PC 30 on the basis of the detected ID information (S2). In accordance with the determination result, the switching control unit 33 opens the switch 32 electrically (S4).

For this reason, a signal outputted from the interface circuit 31 is not sent to the second port replicator 60 and the interface circuit 31 of the first PC 30 becomes electrically unsusceptible to the power circuit 61 of the second port replicator 60.

Figure 4:
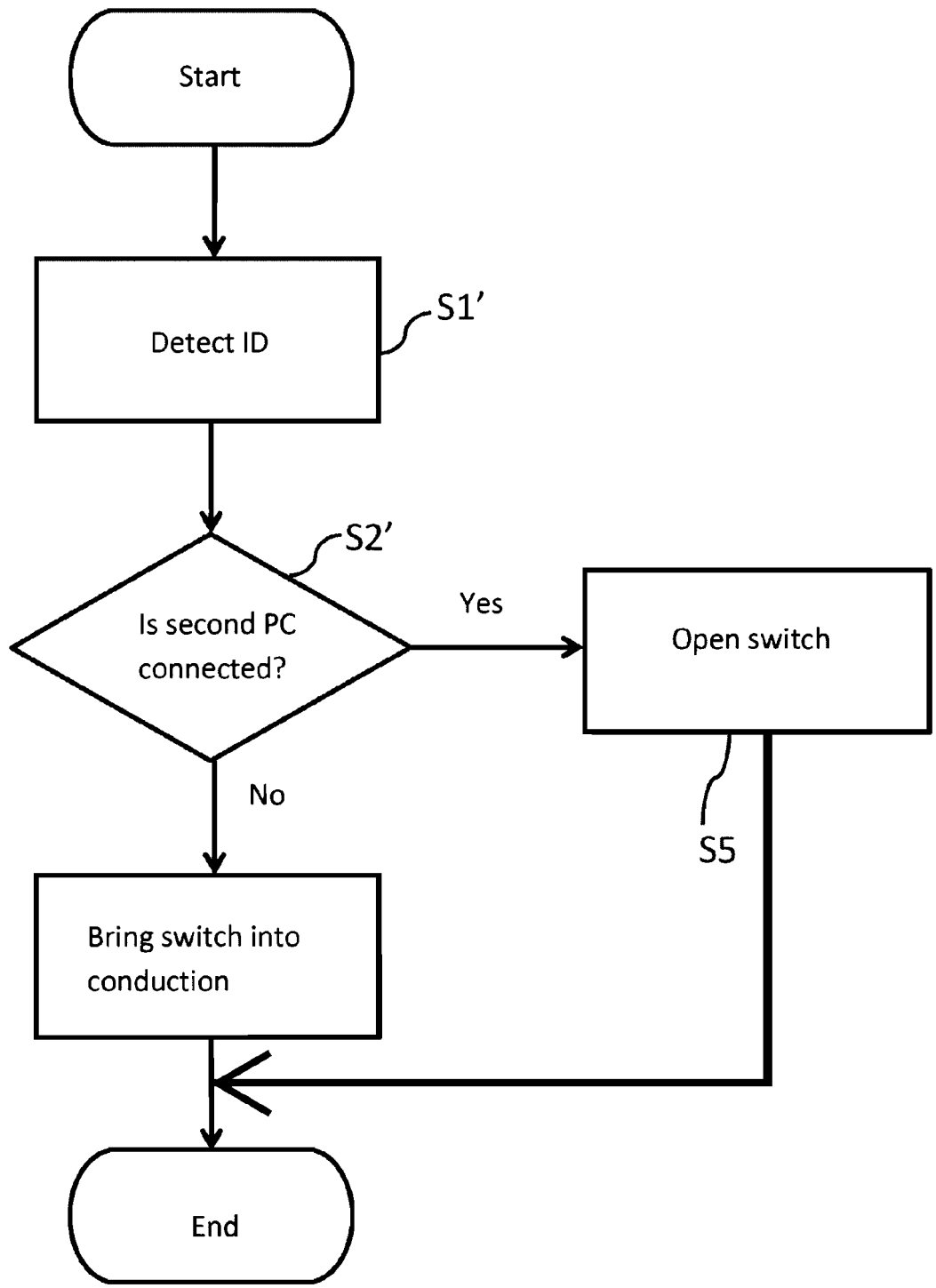
FIG. 4 is a flowchart of the information processing system according to one embodiment.

FIG. 4 is another flowchart showing the operation of the information processing system. When the second PC 40 and the first port replicator 50 are connected to each other (broken lines in FIG. 2), the switching control unit 53 determines (S2') the type of the second PC 40 on the basis of the ID information sent from the ID output unit 43 (S1') and opens the switch 52 electrically (S5). As a result, power outputted from the power circuit 41 is not sent to the first port replicator 50 and the interface circuit 51 of the first port replicator 50 becomes electrically unsusceptible to the power circuit 41 of the second PC 40.

As described above, when the first PC 30 and the second port replicator 60 are connected to each other or the second PC 40 and the first port replicator 50 are connected to each other, the interface circuit 31 becomes electrically unsusceptible to the power circuit 61 and the interface circuit 51 becomes electrically unsusceptible to the power circuit 41. Thus, no misoperation will occur in the PCs, the port replicators, and the peripheral devices that are connected to each other.

[3. Effects of Embodiment, Etc.]

When the first PC 30 and the first port replicator 50 are connected to each other, the terminals 50a and 60a, which have the same pin arrangement, each function as a signal terminal. When the second PC 40 and the second port replicator 60 are connected to each other, the terminals 50a and 60a each function as a power terminal. Thus, even if a PC connectable to the port replicator 20 becomes multifunctional, it is possible to suppress a significant increase in the number of pins of the connectors 11 and 23. Further, it is possible to keep up with functionally improved PCs while maintaining compatibility with the past products.

In the present embodiment, the number of the PCs and the port replicators is not limited to two.

In the present embodiment, although each ID information is automatically detected when the computer and the port replicator are connected to each other, any of the following configurations may also be used; the computer asks the port replicator for its ID and the port replicator sends the ID information to the computer, and the port replicator asks the computer for its ID and the computer sends the ID information to the port replicator.

The first PC 30 according to the present embodiment is one example of the first information processor. The second PC 40 according to the present embodiment is one example of the second information processor. The first port replicator 50 and the second port replicator 60 according to the present embodiment are examples of the connection device. The first port replicator 50 according to the present embodiment is one example of the first connection device. The second port replicator 60 according to the present embodiment is one example of the second connection device. The terminals 50a and 60a according to the present embodiment are examples of the terminal. The switch 32 according to the present embodiment is one example of the switch. The switching control unit 33 according to the present embodiment is one example of the switching control unit.

The present application is useful for an information processor and an information processing system.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information processing system, comprising:
  a plurality of information processors including a first information processor and a second information processor; and
  a plurality of connection devices including a first connection device and a second connection device,
  each of the plurality of connection devices comprising a connector,
  each of the plurality of information processors being selectively connectable to each of the plurality of connection devices via the connector,
  wherein the plurality of information processors are configured to output signals through a selectively connected one of the plurality of connection devices to one or more peripheral devices connected to the selectively connected one of the plurality of connection devices, the signals being adapted for the one or more peripheral devices, the first connection device comprising:
- a first terminal of the connector, the first terminal having a predetermined position at the connector configured to be connectable to a respective terminal arranged at a predetermined position in each of the plurality of information processors,
- a first switch connected to the first terminal and switchable between conduction and open states,
- a first interface connected to the first switch, and
- a first switching control unit for controlling the operation of the first switch, the second connection device comprising:
- a second terminal of the connector, the second terminal having a predetermined position at the connector configured to be connectable to the respective terminal in each of the plurality of information processors,
- a first power circuit connected to the second terminal, and
- a first power control unit for controlling the first power circuit, the first information processor comprising:
- a second interface connected to the respective terminal,
- a second switch connected to the second interface and switchable between conduction and open states, and
- a second switching control unit for controlling an operation of the second switch, and the second information processor comprising:
- a second power circuit, and
- a second power control unit for controlling an operation of the second power circuit, and when the first connection device is connected to the first information processor, the first switching control unit brings the first switch into a conduction state and at the same time the second switching control unit brings the second switch into a conduction state, such that signals to be supplied to the peripheral devices are outputted from the first information processor to the first connection device through a connection of the respective terminal and the first terminal via the connector, when the second connection device is connected to the second information processor, the first power control unit controls the operation of the first power circuit and at the same time the second power control unit controls the operation of the second power circuit, such that power to be supplied to the peripheral devices are outputted from the second information processor to the second connection device through a connection of the respective terminal and the second terminal via the connector, when the first connection device is connected to the second information processor, the first switching control unit opens the first switch, and when the second connection device is connected to the first information processor, the second switching control unit opens the second switch.

* * * * *